(12) United States Patent
Donohue

(10) Patent No.: US 9,527,344 B1
(45) Date of Patent: Dec. 27, 2016

(54) TERRAIN RESILIENT WHEEL MAINTAINING A UNIFORM ELEVATION

(71) Applicant: Patrick Donohue, Portland, OR (US)

(72) Inventor: Patrick Donohue, Portland, OR (US)

( * ) Notice: Subject to any disclaimer, the term of this patent is extended or adjusted under 35 U.S.C. 154(b) by 0 days.

(21) Appl. No.: 14/680,027

(22) Filed: Apr. 6, 2015

Related U.S. Application Data

(63) Continuation of application No. 13/340,568, filed on Dec. 29, 2011, now abandoned.

(51) Int. Cl.
| | | |
|---|---|---|
| *B60B 19/04* | (2006.01) | |
| *B60B 9/04* | (2006.01) | |
| *B60B 9/26* | (2006.01) | |
| *B60B 27/00* | (2006.01) | |
| *B60B 1/00* | (2006.01) | |
| *B60B 21/00* | (2006.01) | |

(52) U.S. Cl.
CPC ................. *B60B 19/04* (2013.01); *B60B 1/00* (2013.01); *B60B 9/04* (2013.01); *B60B 9/26* (2013.01); *B60B 21/00* (2013.01); *B60B 27/0047* (2013.01); *B60B 2900/313* (2013.01); *B60B 2900/551* (2013.01); *B60B 2900/90* (2013.01)

(58) Field of Classification Search
CPC .............. B60B 9/04; B60B 9/26; B60B 19/04; B60B 21/00; B60B 1/00; B60B 27/0047
See application file for complete search history.

(56) References Cited

U.S. PATENT DOCUMENTS

| | | | | |
|---|---|---|---|---|
| 992,085 | A * | 5/1911 | Tucker ...................... | B60B 9/26 152/84 |
| 1,297,287 | A * | 3/1919 | Worsley .................... | B60B 9/26 152/76 |
| 2,916,331 | A * | 12/1959 | Gardner ................... | B60B 19/04 305/19 |
| 3,459,454 | A * | 8/1969 | Liston ................... | B60B 1/0207 301/5.1 |
| 5,492,390 | A * | 2/1996 | Kugelmann, Sr. ...... | B60B 19/00 301/5.1 |
| 2004/0051373 | A1* | 3/2004 | Tolkachev ................ | B60B 9/26 301/55 |
| 2004/0069385 | A1* | 4/2004 | Timoney .................. | B60O 7/18 152/69 |

* cited by examiner

*Primary Examiner* — Kip T Kotter

(57) ABSTRACT

A wheel includes a central hub and a flexible rim. A drive band configuration including a plurality of flexible bands extends as spokes from the central hub to the rim. The hub and band configuration cause the rim to flex toward and away from the hub as the wheel moves.

4 Claims, 8 Drawing Sheets

US 9,527,344 B1

TERRAIN RESILIENT WHEEL MAINTAINING A UNIFORM ELEVATION

BACKGROUND

Wheels and tracks are a primary source of propulsion and/or motion for a variety of vehicles and applications. Conventional wheels and tracks tend to churn the terrain they move over. Wheel designs thus could benefit from a greater capability to adapt to the terrain while maintaining stability and forward progress.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

Preliminaries

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

Overview

Embodiments of a wheel are described, having a load-bearing (central) axis that shifts horizontally in a uniform horizontal plane as it moves across the terrain. The wheel includes a central hub and a flexible rim. A drive band configuration for the wheel includes flexible bands extending as spokes from the central hub to the rim. The hub and band configuration are configured to cause the rim to flex toward and away from the hub as the wheel moves. The wheel thus tends to unfold over the terrain, rather than churn the terrain as would a conventional wheel.

Detailed Descriptions of Particular Embodiments

Figure 1:
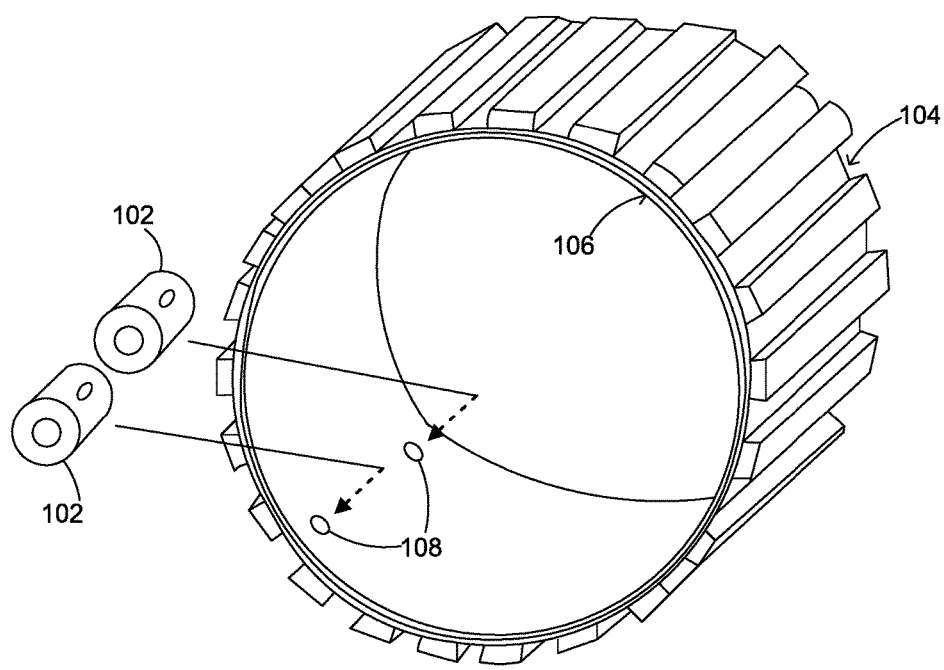
FIG. 1 illustrates a tread and rim that form part of a terrain adaptable wheel.

FIG. 1 illustrates a tread 104 and rim 106 that form part of a terrain adaptable wheel. Axle mounts 102 may be attached to the rim 106, for example using mounting holes 108 (e.g., via machine screws through the mounting holes). The tread 104 is illustrated as a caterpillar type, but may in fact be any tread suitable to the vehicle and the terrain. The rim 106 may be metal, plastic, or other suitable materials. Likewise, the tread 104 may be rubber, metal, plastic, or any suitable material. Multiple axle mounts 102 may be fixed to the rim 106 at multiple locations. The ends of the rim 106 are illustrated with a slight gap between them, but would typically be joined together. In some designs the rim 106 may be constructed using two strips of clock spring, fused to a single strip of rubber tire.

Typically, the axle mounts 102 will be spaced at equal intervals around the circumference of the rim 106. Embodiments including four and six axle mounts 102 will be described, although other numbers of axis mounts are also possible depending upon requirements of the particular implementation.

Figure 2:
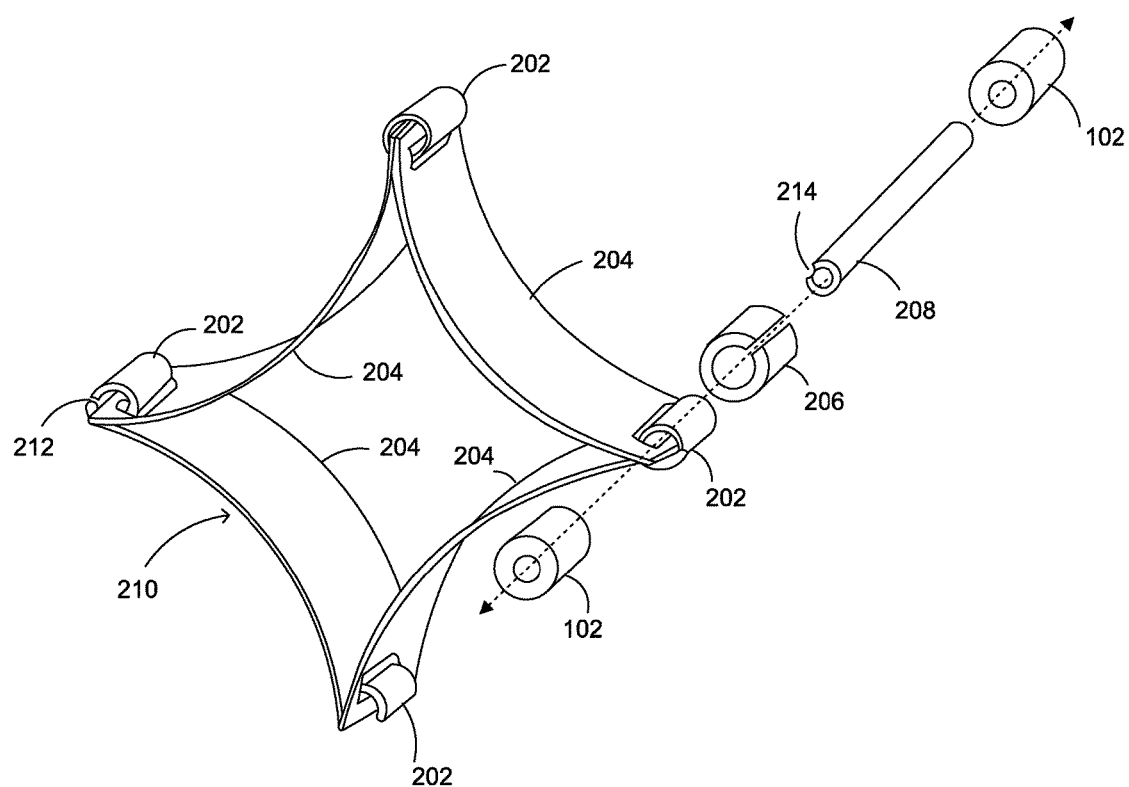
FIG. 2 illustrates a configuration of drive bands that may be coupled to the axis mounts.

FIG. 2 illustrates a configuration of drive bands 210 that may be coupled to the axle mounts 102. The drive band configuration 210 is comprised of multiple drive bands 204. Each drive band 204 may be formed to flex along a long axis of the band 204 and may be substantially rigid to both sheer and twisting force along axes perpendicular to the long axis. Example materials for the band 204 are carbon steel, stainless steel, other metals and alloys, and plastic. The bands 204 are joined together at each end using couplers 202. Each coupler 202 couples a joint of the band configuration 210 to an axle mount 102 via an inserted axle 208. The axle 208 is inserted through the coupler 202 and through the axle mounts 102 on either end of the axle 208. A flexible cover 206 (e.g., a cylindrical polyethylene cover) may be fitted over each coupler 202 to reduce friction of the coupler 202 against the axle mounts 102. Before inserting the axle 208, the coupler 202 is rotated so that once the axle 208 is inserted, a gap 212 in the coupler 202 is rotated 180 degrees from a gap 214 in the axle 208. This secures the joint between drive bands 204 and also allows for some limited motion of the joint within the coupler 202 once it is coupled to the axle mount 102 during rotation of the wheel.

One design includes a drive band configuration constructed from four bands joined at their ends into a closed four-sided periphery. Another design includes a drive band configuration constructed from six bands joined at their ends into a closed six-sided periphery. Designs including n numbers of bands formed into closed n-sided peripheries (eight, ten, etc.) are also possible.

Figure 3:
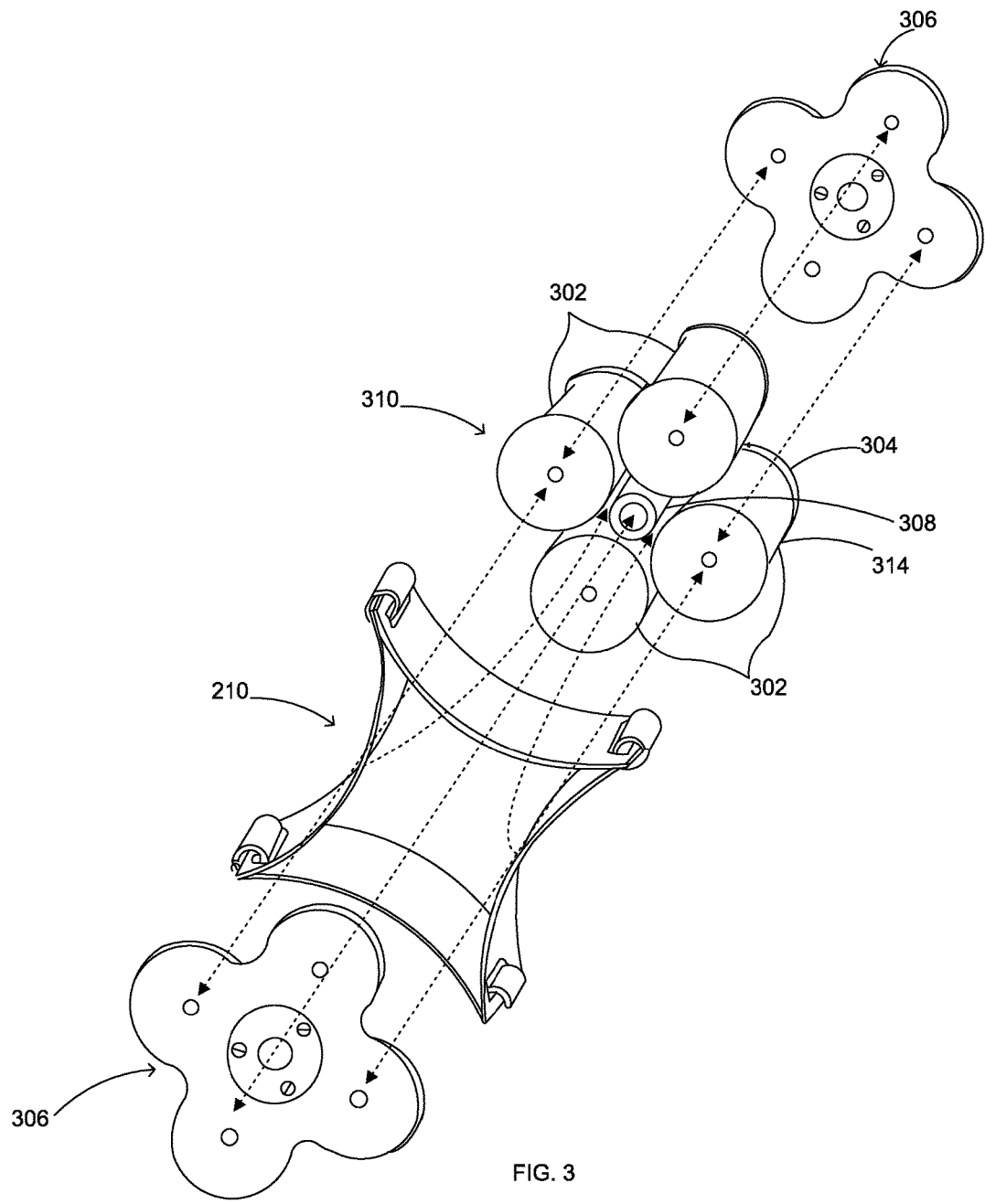
FIG. 3 illustrates construction of a wheel hub.

FIG. 3 illustrates construction of a wheel hub 310. The wheel hub 310 is constructed from a plurality of hub components 302. Hub components 302 are symmetrically positioned around a center axle 308. Each hub component 302 may comprise ends 304 having a diameter (circumference) that is larger in relation to an inner circumference of the hub component 302. In some designs (e.g., four spoke designs), the ends 304 are separate elements rotationally coupled to the hub component 302. In these designs, as the rim 106 moves inward toward the hub 310, it contacts the ends 304 of the hub components 302, and the ends 304 rotate against the rim 106 as the wheel turns. The ends 304 rotate against the rim 106 in an opposite direction of rotation of the inner diameter 314 against the bands 204. This provides stability to the flexible rim 106 without decreasing terrain flexibility. Thus each hub component 302, as a unit including its ends 304, simultaneously rotates both clockwise and counterclockwise as the wheel turns.

The band configuration 210 is compressed inwardly near the center of each band 204 and compressed to fit between the center axle 308 and each of the hub components 302. The result is that each spoke from the hub 310 to the rim 106 comprises two bands 204 pressed together. Couplers 306 are fitted over both ends of the hub 310 and retain the band configuration 210 within the hub 310 and retain the hub components 302 in a symmetrical configuration. Power from a drive axle (e.g. axle 308) may be transferred to the hub 310 via the couplers 306 in some designs.

Figure 7:
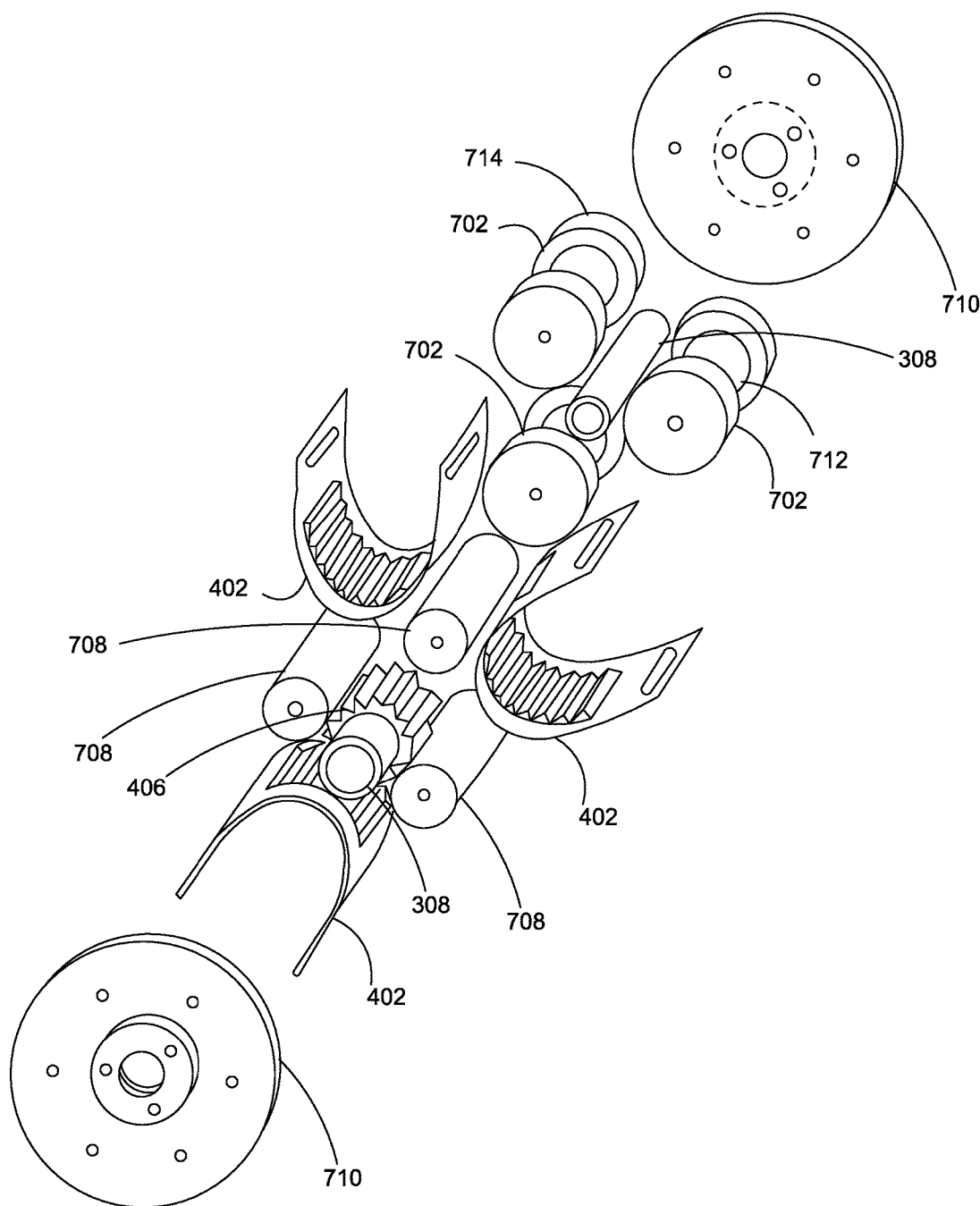
FIG. 7 illustrates a gear driven six spoke hub design.
Figure 8:
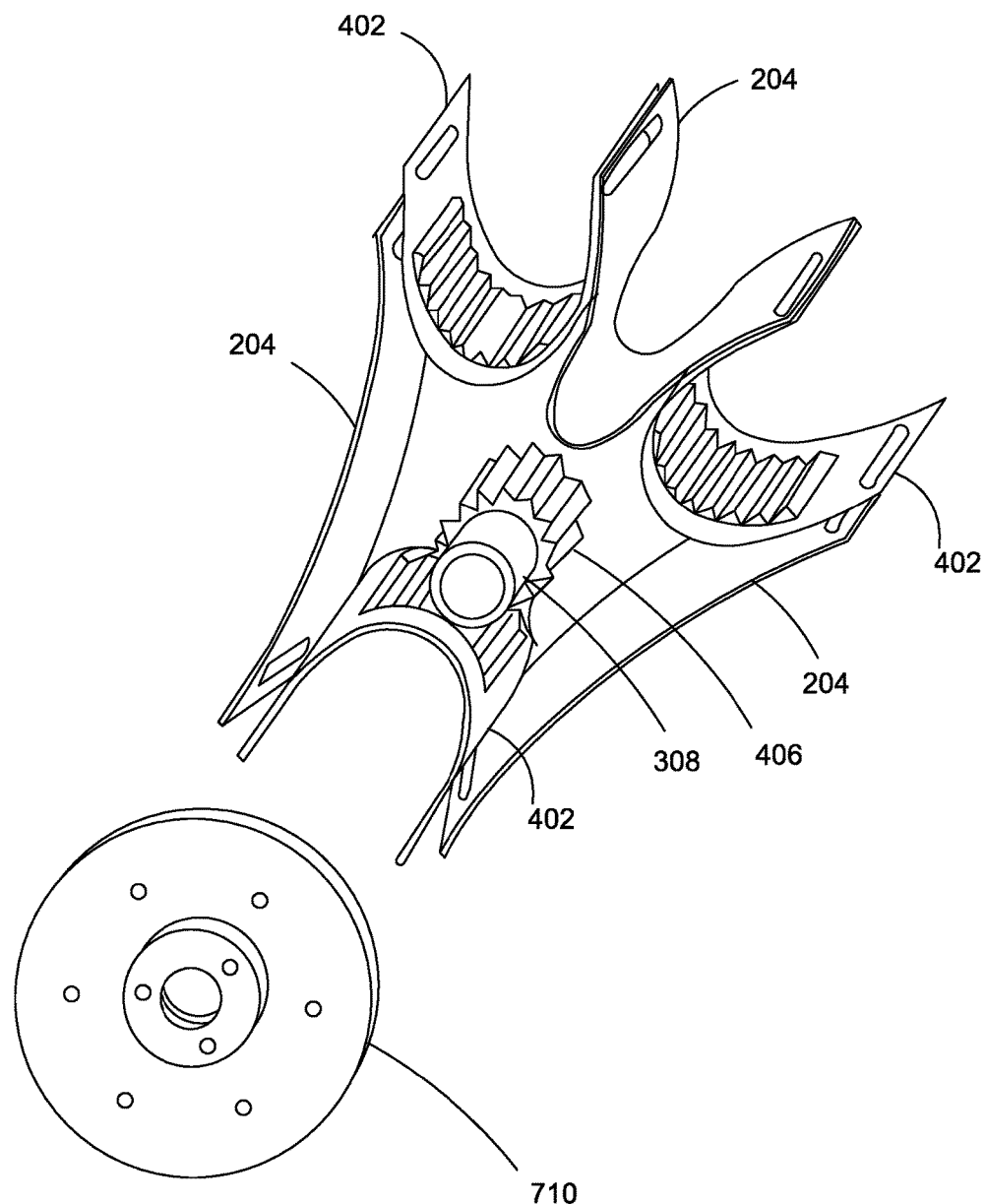
FIG. 8 illustrates a hybrid design employing bands with gear tracks and bands without gear tracks.

In some implementations, particularly those that use a coordination gear on the center axle 308, some hub components have a first inner circumference 314, and others have a second, smaller circumference (refer to FIGS. 7 and 8). The smaller circumference components are used as spacers to limit the rim 106 minimal distance from the center axle 308 as the wheel turns and to hold the bands 402 snug with the gear 406.

Figure 4:
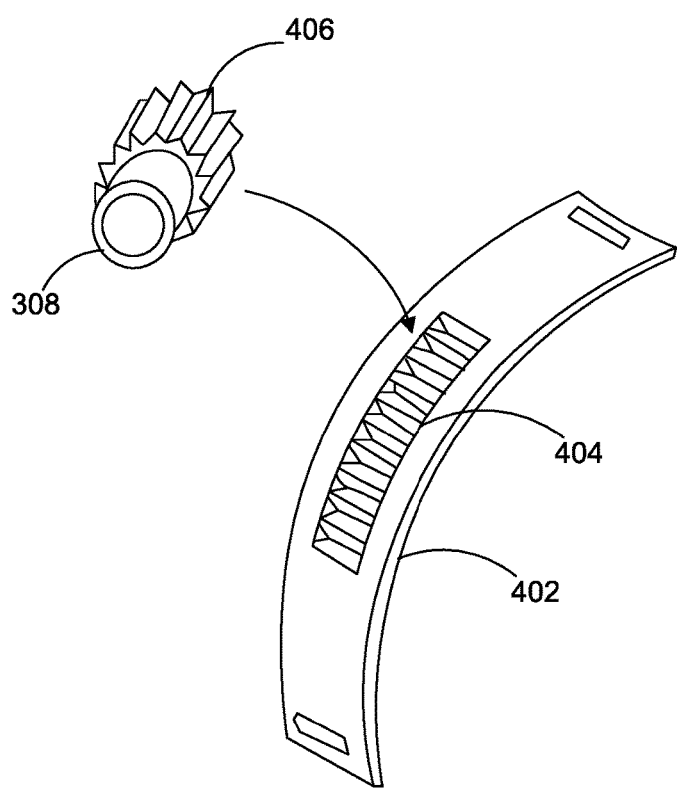
FIG. 4 illustrates a drive gear that may be fitted to the central axis for higher torque applications.

FIG. 4 illustrates a coordination gear 406 that may be fitted to the central axle 308. The gear 406 coordinates motion of the bands 402. Each band 402 of the band configuration 210 may comprise a gear track 404 to mate with teeth of the coordination gear 406. In models employing a coordination gear 406, each spoke from the hub 310 to the rim 106 may comprise only a single band 402. The gear 406 rotates freely upon the outside of the central axle 308 of the wheel, coordinating motion of the bands 402.

Figure 5:
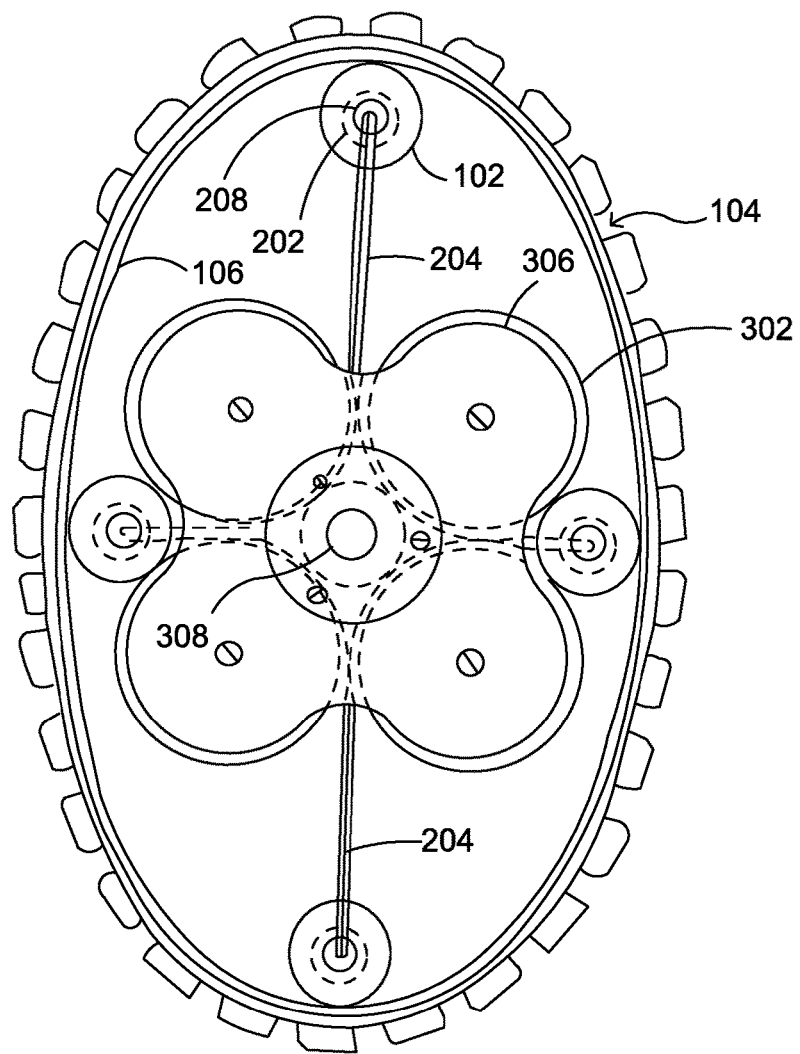
FIG. 5 illustrates a completed wheel with four hub components.

FIG. 5 illustrates a completed wheel with four hub components 302. The bands 204 are compressed between the central axle 308 and the hub components 302. Each band is coupled to the rim 106 by axle mounts 102. As the wheel turns, the ends of the bands 204 pivot around the axle 208 which couples the bands 204 to the axle mounts 102. The bands 204 are extended away from the hub 310 or are drawn toward the hub 310, depending on the position of the wheel, giving the rim 106 and tread 104 a peripheral shape that varies according to the position of the wheel and the topography under the wheel. The rim 106 and tread 104 yield and flex according to the terrain, thus shifting mass of the wheel and any associated vehicle more directly over a force normal to the surface being traversed. In this manner, the wheel adapts efficiently to the terrain it is traversing.

A wheel employing a hub design in accordance with these features and principles swivels between a plurality (e.g., two) pivot points of the rim 106 as it rotates. The hub oscillates between the ends of the flexible spokes. Each spoke exhibits a cycle of advancing forward of the hub, receding inward toward the hub, and advancing rearward from the hub. The spokes act in unison to deflect the rim in a manner that contributes to gripping the terrain.

In the case of a four-spoke wheel, the bottom spoke, orthogonal to the ground, recedes inward towards the hub. This causes the top spoke to also recede inward. The other two spokes (horizontally positioned) advance outward providing indirect load-support for the hub.

The four-spoke wheel design employs hub components 302 comprising an inner diameter (circumference 314) and a larger, outer diameter 304 that rotates independently of the inner diameter 314. The outer diameter 304 of the components 302 may rotate against the rim 106 as the wheel turns, in an opposite direction of rotation as the rotation of the inner diameter 314. The components 302 may be constructed from an inner rotating member with washers rotationally coupled to the ends.

The particulars of the motion and shape of the rim may vary between designs that employ the features and principles described herein, depending upon design details of the implementation and components.

Figure 6:
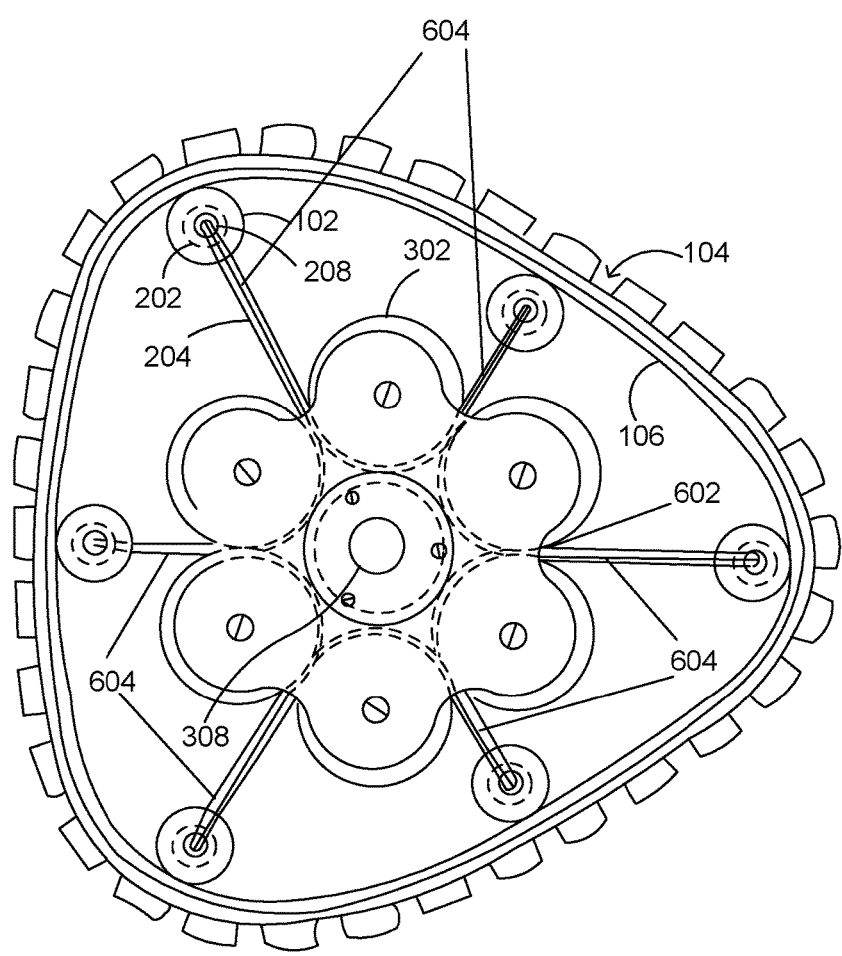
FIG. 6 illustrates a wheel having six hub components and utilizing six bands.

FIG. 6 illustrates a wheel having six hub components 302 and utilizing six bands 204. As the wheel turns, the relative distance of the rim 106 from the central axle 308 varies according to the topography of the surface. As also shown in FIG. 5, the bands 204 are pressed together by motion of the hub components 302 (collectively, the "hub") to form spokes 604 having a length extending from a point of origin 602 at the hub, to the rim 106. The wheel's mass is efficiently shifted more directly over the force normal to the surface being traversed.

The central bottom spoke recedes inward which causes the two adjacent spokes to advance outward at an acute angle to the terrain. This deflection results in the hub being supported by three spokes and not just a single spoke, as is the case of a four-spoke wheel.

The particulars of the motion and shape of the rim may vary between designs that employ the features and principles described herein, depending upon design details of the implementation and components.

Designs comprising six, eight, and higher numbers of spokes need not comprise hub components 302 with a larger, independently-rotating outer diameter (as do certain four spoke designs, e.g. FIG. 5). Two spokes adjacent to the bottom, central, orthogonal spoke advance outward at an acute angle to the terrain during rotation, maintaining the hub is in a state of equilibrium, balanced by opposing forces of the three supporting spokes. In these designs, the hub components 302 do not ride upon (rotate against) the rim 106 of the wheel.

FIG. 7 illustrates a gear coordinated six spoke hub design. The hub comprises bands 402 comprising gear tracks, as illustrated, for example in FIG. 4. A gear 406 coordinates motion of the bands 402. Each end of a band 402 forms a spoke of the hub. Thus, three bands are sufficient to construct a six-spoke hub in the gear coordinated design. Bands 402 ride upon the outer circumference 714 of hub components 702. The outer circumference 714 of hub components 702 allows the gear tracked band to tightly arc component 702. Couplers 710 prevents lateral motion of the bands 402.

Spacer hub components 708 are provided to fit in a space between the larger diameter hub components 702 when the hub is assembled. Spacers 708 fill in these gaps and retain the bands 402 in the hub and against the gear 406. Couplers 710 may be employed to secure and properly orient the hub components in relation to one another, serving a similar purpose of a component 306 in FIG. 3. Couplers 710 may also transfer power from a drive axle (e.g., 308) to the hub.

The spacers 708 do not necessarily have a smaller diameter than the inner circumference 712 or outer circumference 714 of the hub components 702. Rather, the spacers 708 has a diameter selected to fit snugly between the bands 402 and the gear 406. For example, the circumference of the spacers 708 may be equal to the inner circumference 712 of the hub components 702 in some designs, or even larger in circumference depending on the configuration of the hub components 702.

FIG. 8 illustrates a hybrid hub design employing bands with gear tracks and bands without gear tracks. Elements of this hybrid model which are not essential to the description are omitted from the drawing for clarity. The hybrid model may achieve benefits of both the model of FIG. 3. and the gear coordinated model of FIG. 7. The hybrid model comprises bands 402 with gear tracks, and smooth bands 204 lacking gear tracks. The bands 402 arc the outer circumference 714 of the hub components 702. The bands 204 arc the circumference of the spacer hub components 708. Each spoke of the hub comprises a portion of a band 402 and a portion of a band 204. This makes the spokes stronger while still providing for power transfer to the wheel rim using drive gear 406. Hybrid implementations comprise two bands per spoke (one gear tracked band, one smooth band). The gear tracked band 402 engages the gear 406. The smooth bands 204 do not engage the gear 406 but instead arc the spacer hub components 708. The spacer hub components 708 are sized to prevent the smooth bands 204 from engaging the gear 406. The gear tracked bands 402 coordinate motion of the spokes, while the smooth bands 204 eliminate chatter and add rigidity to the spokes. The spokes may attach to the rim mounts 202 where the ends of bands 402, 204 meet, as described for example in conjunction with FIGS. 1 & 2.

The performance of a wheel employing designs in accordance with the described principles/features may be adjusted by varying the "true circumference" of the wheel. Extending the circumference of the wheel by 4-10% beyond the "true circumference" may flatten the bottom side of the wheel, increasing its grip upon the terrain and its ability to roll smoother upon flat, hard surfaces. The "true circumference" is calculated from the diameter measured from center of the wheel hub to the inside surface of the rim.

Uses of the rims/wheels in accordance with the described principles/features include, by way of example, tracked vehicles, steep climbing vehicles, rough or multi-terrain vehicles (e.g., military, amphibious, police, scientific), and robotic vehicles.

Comparison of Gear Driven and Non Gear-Driven Designs

Table 1 provides a comparison of implementations including only gear track bands (A), only smooth bands (B), and both gear track and smooth bands (C). Each hub design comprises six spokes. Of course, other hub designs along the same principles may include a different number of spokes.

TABLE 1

Comparison of hub designs

| | A | B | C |
| --- | --- | --- | --- |
| Number of bands | 3 | 6 | 6 |
| Number of gear-tracked bands | 3 | 0 | 3 |
| Number of spokes | 6 | 6 | 6 |
| Bands per spoke | 1 | 2 | 2 |
| Number of hub components engaging spoke bands | 3 (3 additional hub components act as spacers only) | 6 | 6 |
| Number of spacer hub components | 3 (3 hub components act as spacers only, and do not engage spoke bands) | 0 (no spacer hub components are used) | 3 (3 hub components act as spacers but also engage spoke bands) |
| Hub component type | (1) Larger outer diameter with recessed inner diameter (2) Spacers with uniform diameter smaller than outer diameter of (1) | Uniform diameter | (1) Larger outer diameter with recessed inner diameter (2) Spacers with uniform diameter smaller than outer diameter of (1) |

Implementations and Alternatives

For a predetermined overall hub size, a number of spokes (e.g., 4, 6, 8 . . . ) may be chosen. Based on the hub size and number of spokes, a size of the hub components is determined to pressure fit against the compressed band configuration while encircling the center axle.

As previously noted, in implementations that utilize a coordination gear and bands with gear tracks, a different sizing may be utilized for the hub components. For example, for a six spoke design, three hub components may have a first diameter, and three hub components may utilize a smaller or different diameter. Spacer components of a different diameter may act to keep the gear engaged against the gear tracks on the bands and/or to maintain contact between the bands and the various hub components, while maintaining a consistent minimum distance between the rim 106 and the central axle (i.e., acting as spacers).

The hub components may be formed from a single piece of molded or milled material, or assembled from multiple components (e.g., one component for the band roller, others for the ends that roll against the wheel rim). The couplers and central axle may be a single piece, or assembled from multiple components. The hub perimeter may have a non-circular cross section (e.g., square, hexagonal, octagonal, etc). The hub components may be implemented as ball or roller bearings, with or without an extended inner ring.

Particular embodiments of a wheel utilizing certain mechanical features/principles have been described. Variations of the described embodiments utilizing these or similar features and principles will now be apparent to those having skill in the art in light of this disclosure. The range of wheel designs that the inventor has conceived is not limited to the disclosed embodiments, but to all designs that utilize the features and principles herein disclosed, and as set forth in the claims.

What is claimed is:

1. A wheel, comprising:
a central hub;
a flexible rim;
a spoke assembly extending from the central hub to the flexible rim, the spoke assembly comprising a plurality of spokes, each spoke formed from a plurality of distinct bands pressed together and separated apart by motion of the central hub, each spoke having a spoke length defined to be a distance along the spoke from a point of contact of the spoke on the flexible rim to a point of origin of the spoke at the central hub; and
the spoke assembly configured such that contact of the flexible rim with an object as the wheel moves forward causes the spoke length of a number of the spokes to shorten and the spoke length of an equal number of the spokes to lengthen.

2. The wheel of claim 1, further comprising:

the central hub comprising a plurality of hub components symmetrically arranged around a central axle; and the spoke assembly configured to move between the plurality of hub components and the central axle.

3. The wheel of claim 2, further comprising:

the bands comprising teeth to mate with a gear adjoining to the central axle.

4. The wheel of claim 1, further comprising:

the bands forming the plurality of spokes joined end-to-end into a closed periphery.

* * * * *